United States Patent
Hosoda et al.

(10) Patent No.: US 6,917,402 B2
(45) Date of Patent: Jul. 12, 2005

(54) OPPOSITE SUBSTRATE FOR LIQUID CRYSTAL DISPLAY PANEL WITH PARTICULAR MICROLENSES AND LAYERED LIGHT SHIELDS, AND METHOD OF FABRICATING THE SAME

(75) Inventors: Keiji Hosoda, Tokyo (JP); Akihiro Kawahara, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/255,931

(22) Filed: Sep. 27, 2002

(65) Prior Publication Data
US 2003/0076472 A1 Apr. 24, 2003

(30) Foreign Application Priority Data
Sep. 28, 2001 (JP) ......................... 2001-303177

(51) Int. Cl.[7] .............................. G02F 1/1333
(52) U.S. Cl. ....................................... 349/111
(58) Field of Search ................. 349/44, 110, 111

(56) References Cited

U.S. PATENT DOCUMENTS

| | | | | |
|---|---|---|---|---|
| 5,754,263 A | * | 5/1998 | Akiyama et al. | ............ 349/110 |
| 5,850,276 A | * | 12/1998 | Ochi et al. | ................. 349/158 |
| 6,623,999 B1 | * | 9/2003 | Nishikawa | .................... 438/29 |
| 6,657,700 B2 | * | 12/2003 | Sako et al. | ................. 349/158 |
| 2003/0062544 A1 | | 4/2003 | Mochizuki | |

FOREIGN PATENT DOCUMENTS

| | | |
|---|---|---|
| JP | 9-211439 | 8/1997 |
| JP | P2003-167534 A | 6/2003 |

* cited by examiner

*Primary Examiner*—Frank G. Font
*Assistant Examiner*—Timothy L. Rude
(74) *Attorney, Agent, or Firm*—Sughrue Mion, PLLC

(57) ABSTRACT

Upon fabricating an opposite substrate, a concave portion having a predetermined depth is formed on the surface of a transparent substrate. Then, a light-shielding film is formed in the concave portion, and further, the surface of the light-shielding film and the surface of the transparent substrate are polished so as to form the same plane. Accordingly, an orientation film formed over the transparent substrate can be flattened to realize uniformity of a rubbing treatment.

4 Claims, 3 Drawing Sheets

OPPOSITE SUBSTRATE FOR LIQUID CRYSTAL DISPLAY PANEL WITH PARTICULAR MICROLENSES AND LAYERED LIGHT SHIELDS, AND METHOD OF FABRICATING THE SAME

BACKGROUND OF THE INVENTION

1. Field of the Invention

The present invention relates to a liquid crystal display panel to be used as a light bulb in a liquid crystal projector or the like (hereinafter simply referred to as "liquid crystal display panel"), and more specifically, relates to a structure of a black matrix that optically intercepts or blocks those portions other than pixel openings in the liquid crystal display panel and a method of fabricating such a black matrix.

2. Description of the Related Art

Generally, in a liquid crystal display panel, intense projected light is entered from the side of an opposite substrate that is disposed so as to confront a driving substrate (TFT (Thin Film Transistor) array substrate) with a liquid crystal phase being an electro-optic substance interposed therebetween. Such an opposite substrate may be often called a counter substrate or an opposing substrate.

If this intense projected light enters channel forming regions comprising a-Si (amorphous silicon) films or p-Si (polysilicon) films of TFTs disposed on the driving substrate, photoelectric current is generated in those regions due to the photoelectric transfer effect to deteriorate transistor characteristics of the TFTs. Therefore, in order to suppress this phenomenon, light-shielding films arranged in a matrix form, called a black matrix, are generally formed on the opposite substrate at positions confronting the respective TFTs.

In general, on the surface of the opposite substrate where the black matrix is formed, an ITO film serving as a transparent electrode for driving liquid crystals is formed, and further, an orientation film in the form of a polyimide thin film for controlling orientation of liquid crystal molecules is formed on the ITO (Indium Tin Oxide) film. This orientation film is subjected to a rubbing treatment wherein the surface of the film is rubbed by a roll made of nylon or the like to form stripes thereon.

The opposite substrate having been subjected to the rubbing treatment is joined with the driving substrate, and liquid crystals are poured in between the substrates that are then sealed, thereby to fabricate a liquid crystal display panel.

Recently, following the increased number of pixels in liquid crystal projectors, the size of openings of a black matrix formed on an opposite substrate used in a liquid crystal projector, an interval between the openings, a cell gap between the opposite substrate and a driving substrate, and so on, have been reduced.

For example, practically, the size of each opening of a black matrix is set to 14 $\mu$m, an interval between the openings (line width of black matrix) is set to 4 $\mu$m, a cell gap between a driving substrate and an opposite substrate is set to 3 to 4 $\mu$m.

Therefore, there has been a problem, wherein a malfunction of a liquid crystal display panel is caused by the fact that, due to intense projected light entering the liquid crystal display panel, stray light is generated in liquid crystal cells, the temperature of the liquid crystal display panel increases, and so on.

In view of this, JP-A-9-211439, for example, discloses that a high reflectance layer is first provided on a glass substrate forming an opposite substrate and then a low reflectance layer made of black resin or Cr oxide is provided thereon, thereby to form a black matrix on the glass substrate.

With this structure, a malfunction caused by stray light generated in liquid crystal cells is prevented by the low reflectance layer, while incident light applied to the black matrix is effectively reflected by the high reflectance layer so as to prevent the increase in temperature of the liquid crystal display panel itself.

However, following the increased number of pixels in a liquid crystal display panel, there has been raised a problem, wherein disturbance occurs in orientation of liquid crystal molecules in a liquid crystal display pane, thereby to cause unevenness or nonuniformity in a projected image.

In addition, upon attempting to fabricate a liquid crystal display panel according to the conventional technique, the present inventors have found that, in case a high reflectance film and a low reflectance film are made of different materials, when patterning the films by etching, it is difficult to control a pattern section due to different etching characteristics of the films caused by the different materials thereof.

Following the increased number of pixels in the liquid crystal display panel, the stability of the section shape of the black matrix pattern has been strictly required. Accordingly, the difficulty in etching control has been further increased.

In view of this, the present inventors have made researches about a cause that generates unevenness in the liquid crystal display panel. The result thereof will be briefly explained with reference to FIG. 3.

FIG. 3 is an exemplary sectional view of an opposite substrate according to the prior art.

The conventional opposite substrate 3 comprises a transparent substrate 10, a black matrix 25, a transparent conductive film 30 and an orientation film 40. The surface of the orientation film 40 includes a portion 41 formed over the transparent substrate 10, a portion 42 formed over the black matrix 25, and a portion 43 formed over a shoulder of the black matrix 25.

In the conventional opposite substrate 3, on the transparent substrate 10 (the side confronting a non-shown driving substrate), the black matrix 25 having a thickness of about 0.1 to 0.12 $\mu$m is formed, and thereon, the transparent conductive film 30 made of ITO or the like as a main component is formed, and thereon, the orientation film 40 made of polyimide or the like as a main component is formed.

Since the black matrix 25 has a pattern, the transparent conductive film 30 and the orientation film 40 also follow the pattern of the black matrix 25, so that steps are generated.

Therefore, on the surface of the orientation film 40, there appear the portion 41 formed over the transparent substrate 10, the portion 42 formed over the black matrix 25, and the portion 43 formed over the shoulder of the black matrix 25.

After the formation of the orientation film 40, a rubbing treatment is applied to the orientation film 40 to rub the surface thereof using a roll made of nylon or the like, thereby to form stripes thereon. In this event, the states of the rubbing treatment on the surface of the orientation film 40 differ among the portion 41 formed over the transparent substrate 10, the portion 42 formed over the black matrix 25, and the portion 43 formed over the shoulder of the black matrix 25. Particularly, in the portion 43 formed over the shoulder of the black matrix 25, unevenness of liquid crystal orientation is liable to occur due to nonuniformity of the rubbing treatment.

Accordingly, it has been found out that the nonuniformity of the rubbing treatment causes the disturbance of the liquid crystal molecule orientation in the liquid crystal display panel, resulting in the unevenness of the projected image.

SUMMARY OF THE INVENTION

The present invention has been made in view of the foregoing problem and has an object to provide an opposite substrate for a liquid crystal display panel that can suppress unevenness occurring in a projected image on the liquid crystal display panel and that can stably fabricate a black matrix with an excellent section shape, and further provide a method of fabricating such an opposite substrate.

For solving the foregoing problem, the present invention has one of the following structures.

(Structure 1)

An opposite substrate for a liquid crystal display panel, the opposite substrate being disposed so as to confront, via a liquid crystal layer, a driving substrate having a plurality of pixel electrodes and a plurality of switching elements for individually switching the plurality of pixel electrodes, the opposite substrate comprising a light-transmitting substrate, wherein, on or over the surface of the light-transmitting substrate on the side thereof confronting the driving substrate, a concave portion is formed at least in regions confronting the switching elements, and a light-shielding film is formed in the concave portion.

With this structure, since the light-shielding film is embedded in the concave portion formed on the light-transmitting substrate, a transparent conductive film and an orientation film formed thereon are each formed as a flat film having no steps. As a result, a rubbing treatment applied to the orientation film is performed uniformly without unevenness. Therefore, after fabricating the liquid crystal display panel, unevenness occurs in orientation of liquid crystal molecules, so that unevenness on the liquid crystal display panel can be suppressed.

The concave portion is formed at least in regions confronting the switching elements formed on the driving substrate. The driving substrate is formed thereon with a plurality of switching elements and gridiron-formed wiring for connecting the plurality of switching elements to each other. The concave portion may be formed into a matrix shape so as to prevent light from entering the plurality of switching elements and the gridiron-formed wiring, or may be formed into stripes so as to prevent light from entering the plurality of switching elements and the wiring in one direction, or may be formed into islands that correspond to the plurality of switching elements, respectively.

The concave portion may be formed directly on the surface of the light-transmitting substrate. Alternatively, a transparent film such as SOG (Spin On Glass) may be formed on the surface of the light-transmitting substrate, then the concave portion may be formed on the surface of this transparent film.

As a method of forming the concave portion, a technique such as wet-type or dry-type etching according to photolithography may be used.

By adopting this structure, the light-shielding film is formed as embedded in the concave portion. Accordingly, a control of the pattern section is performed by a control of the concave portion formed on the transparent substrate. As a result, the control of the pattern section of the light-shielding film can be carried out accurately and stably.

(Structure 2)

The opposite substrate according to Structure 1, wherein the light-shielding film comprises a low reflection thin film and a high reflection thin film formed in the order named from the side of the driving substrate.

With this structure, when the light-shielding film is formed by the high reflection film and the low reflection film for the purpose of suppressing a malfunction of the liquid crystal display panel caused by intense light entering the liquid crystal display panel, both films are formed as embedded in the concave portion.

As a result, it is not necessary to pattern the light-shielding film by etching as required in the prior art. Accordingly, occurrence of a step of the pattern section at an interface between the films caused by a difference in etching characteristic of both materials can be prevented, so that the section shape can be stabilized.

Further, both materials embedded in the concave portion are fixed as surrounded by portions of the transparent substrate. Thus, even if a stress is generated at the interface of both materials due to a thermal stress or the like, since such a stress is supported by the surrounding portions of the transparent substrate, occurrence of exfoliation between both materials can be suppressed.

As a result, such a liquid crystal display panel can be fabricated, wherein even if the intense light enters the liquid crystal display panel, the increase of the temperature becomes quite small, and occurrence of malfunction of the switching elements due to the stray light is reduced largely.

A material of the light-shielding film is not particularly limited, and metal, resin or the like can be used.

Preferably, the reflectance of the high reflection thin film is 70% or greater. As a material of the high reflection thin film, metal such as Ni, Ag, Pt or Al, or an Al alloy containing a small amount of addition metal such as Pd, or the like may be used.

Among them, by using Al or the Al alloy for the high reflection thin film, such a film can be obtained wherein the light reflectance is high in a wavelength region of 380 nm to 700 nm being a visible light wavelength region, and further, the wavelength dependency of the reflectance is low thereby to achieve the uniform reflectance.

It may also be arranged that a reflection increasing film for increasing the reflectance of the high reflection thin film is formed between the high reflection thin film and the light-transmitting substrate. In this case, the combination of the high reflection thin film and the reflection increasing film can exhibit a reflectance of 90% or higher. The reflection increasing film is in the form of a stacked film of two-layer structure comprising a high refraction dielectric thin film made of a material having a relatively high refraction, and a low refraction dielectric thin film made of a material having a relatively low refraction, or in the form of a stacked film comprising the foregoing high refraction dielectric thin film and the foregoing low refraction dielectric thin film that are alternately stacked in plural layers. As the high refraction dielectric thin film, $TiO_2$ (n=2.3 to 2.55), $ZrO_2$ (n=2.05), $CeO_2$ (n=2.2), $Ta_2O_5$ (n=2.1), $Nd_2O_3$ (n=2.15), $HfO_2$ (n=1.95), or ZnO (n=2.1) may be cited, for example. As the low refraction dielectric thin film, $SiO_2$ (n=1.45 to 1.46), $Si_2O_3$ (n=1.55), or $MgF_2$ (n=1.38 to 1.4) may be cited, for example. The foregoing values in brackets represent refractions near a wavelength 550 nm.

On the other hand, the reflectance of the low reflection thin film is preferably 30% or less. A material of the low reflection thin film is preferably metal, metal oxide, metal nitride, metal oxide-nitride, high melting point metal silicide of Ti, Cr, W, Ta, Mo, Pd or the like, or organic black coloring matter. Among them, it is desirable that Cr or Ni, or oxide, nitride or oxide-nitride of Cr or Ni is used for the low reflection thin film. When, as noted above, O and/or N is contained on the surface side of the low reflection thin film, the reflection preventing function is increased, thereby to suppress occurrence of malfunction due to the stray light.

By setting the reflectance of the high reflection thin film to 70% or higher, and the reflectance of the low reflection thin film to 30% or less, even if the intense light enters the liquid crystal display panel, the increase of the temperature becomes quite small, and occurrence of malfunction of the switching elements due to the stray light is reduced largely.

Further, the optical density of the light-shielding film comprising the high reflection thin film and the low reflection thin film is at least 3 or greater, preferably 4 or greater.

(Structure 3)

The opposite substrate according to Structure 1 or 2, wherein a substrate formed with microlenses is provided on the side of the light-transmitting substrate that is opposite to the side thereof where the light-shielding film is formed, and the microlenses are formed at positions confronting openings where the light-shielding film formed in the concave portion is not formed.

With this structure, beam of the incident light entering the opposite substrate for the liquid crystal display panel is narrowed upon passing through the respective microlenses provided correspondingly to the openings of the matrix-shaped light-shielding film. As a result, most of the incident light passes through the opened positions of the light-shielding film and further passes through the driving substrate without entering TFTs (switching elements) formed on the driving substrate.

Accordingly, the thermal load applied to the light-shielding film formed in the opposite substrate and the TFTs formed on the driving substrate, due to the incident light and the stray light is reduced. Accordingly, there can be obtained the reliable opposite substrate for the liquid crystal display panel that is free of occurrence of malfunction, and further, the utilization efficiency of the projected light can be enhanced.

As a result, combined with the structure that the light-shielding film is formed as embedded in the concave portion, by using the opposite substrate for the liquid crystal display panel having this structure, such a liquid crystal panel can be fabricated that is highly reliable and that can project a bright and excellent image.

As the substrate formed with the microlenses, there can be cited such a microlens substrate wherein, onto a light-transmitting substrate having a plurality of concave portions whose bottom walls form curved surfaces, respectively, a transparent material having a refraction higher than that of the substrate (high refraction medium) is filled, and a cover member is joined thereto, or such a microlens substrate wherein, between a light-transmitting substrate having a plurality of concave portions whose top walls form curved surfaces, respectively, and a cover member, a transparent material having a refraction lower than that of the substrate (low refraction medium) is interposed.

(Structure 4)

A method of fabricating an opposite substrate for a liquid crystal display panel, the opposite substrate being disposed so as to confront, via a liquid crystal layer, a driving substrate having a plurality of pixel electrodes and a plurality of switching elements for individually switching the plurality of pixel electrodes, the method comprising the steps of: forming, on or over the surface of a light-transmitting substrate used in the opposite substrate, a concave portion at least in regions confronting the switching elements, the concave portion having a predetermined depth; and forming a light-shielding film in the concave portion.

With this structure, such an opposite substrate can be fabricated securely, easily and for a short time, which can realize such a liquid crystal display panel wherein unevenness does not occur in orientation of liquid crystal molecules, so that unevenness on the liquid crystal display panel can be suppressed. Accordingly, the productivity can be highly improved.

(Structure 5)

The method according to Structure 4, further comprising, after the step of forming the light-shielding film in the concave portion, polishing the surface of the opposite substrate on the side thereof confronting the driving substrate, thereby to form the surface of the light-transmitting substrate and the surface of the light-shielding film into the same plane.

With this structure, the flatness between the light-shielding film and the transparent substrate can be realized securely, easily and for a short time, so that the productivity in opposite substrate fabrication can be largely improved.

As long as it can polish the surface of the opposite substrate on the side thereof confronting the driving substrate, there is no particular limitation about a polishing method. There may be used one-side polishing in which the surface of the opposite substrate only on the side facing the driving substrate is polished, or both-side polishing in which the surfaces of the opposite substrate on both sides thereof are polished. There are available those methods such as a method in which a polishing member in the form of a rotatable roller with polishing tape wound therearound is pressed upon the surface of the opposite substrate to carry out polishing, and a method in which a polishing member in the form of a rotatable surface plate with a polishing pad stuck thereto is pressed upon the surface of the opposite substrate to carry out polishing. When abrasive is not included in the polishing tape or pad, polishing is carried out while supplying a polishing liquid containing abrasive.

(Structure 6)

A method of fabricating an opposite substrate with microlenses for a liquid crystal display panel, the opposite substrate being disposed so as to confront, via a liquid crystal layer, a driving substrate having a plurality of pixel electrodes and a plurality of switching elements for individually switching the plurality of pixel electrodes, and the opposite substrate provided with microlenses on the side thereof not confronting the driving substrate, the method comprising the steps of: forming a plurality of concave portions at least on one surface of a light-transmitting substrate, each of the concave portions comprising a bottom wall that has a curved surface; filling a transparent material into the concave portions, the transparent material having a refraction greater than that of the light-transmitting substrate; joining another light-transmitting substrate to the light-transmitting substrate on the side thereof where the concave portions are opened, thereby to form the microlenses; forming, on or over the surface of the another light-transmitting substrate on the side thereof where the microlenses are not formed, a concave portion at least in regions confronting the switching elements, the concave portion having a predetermined depth; and forming a light-shielding film in the concave portion having the predetermined depth.

With this structure, the opposite substrate with the microlenses for the liquid crystal display panel can be mass-produced easily, so that the liquid crystal display panel that is highly reliable and that can project a bright image can be fabricated with high productivity.

Like in the foregoing structure 1, the concave portion may be formed directly on the surface of the another light-transmitting substrate. Alternatively, a transparent film such as SOG may be formed on the surface of the another light-transmitting substrate, then the concave portion may be formed on the surface of this transparent film.

(Structure 7)

The method according to Structure 6, further comprising, after the step of forming the light-shielding film in the concave portion having the predetermined depth, polishing the surface of the opposite substrate on the side thereof confronting the driving substrate, thereby to form the surface of the another light-transmitting substrate and the surface of the light-shielding film into the same plane.

With this structure, the opposite substrate with the microlenses for the liquid crystal display panel, wherein the shape stability of the light-shielding film is high, can be mass-produced easily, so that the liquid crystal display panel that is highly reliable and that can project a bright image can be fabricated with high productivity.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

Figure 1A:
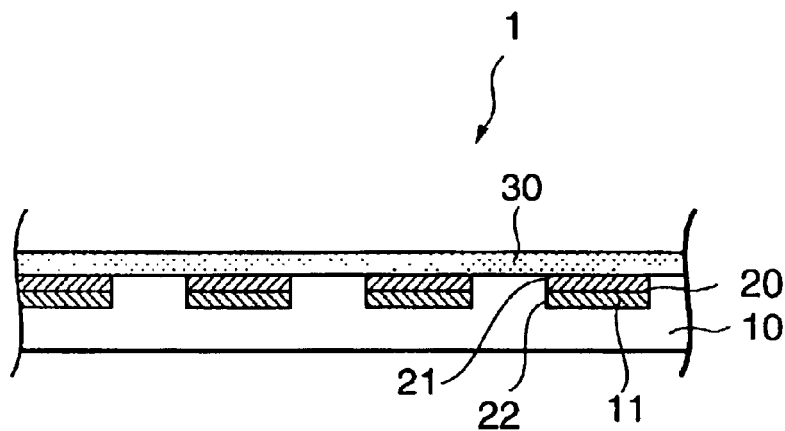
FIG. 1A is a sectional view of an opposite substrate according to an embodiment of the present invention.
Figure 1B:
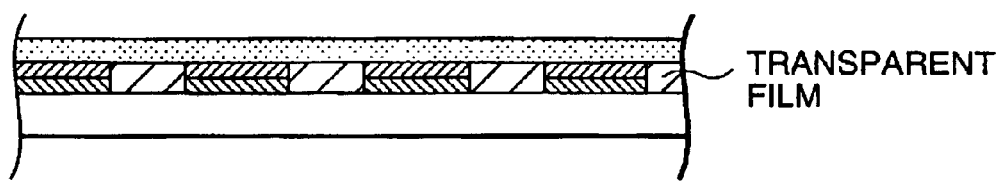
FIG. 1B is a sectional view of an opposite substrate according to a modification of the embodiment of the present invention.
Figure 1C:
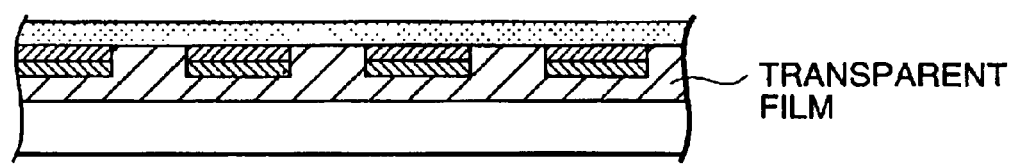
FIG. 1C is a sectional view of an opposite substrate according to another modification of the embodiment of the present invention.
Figure 2:
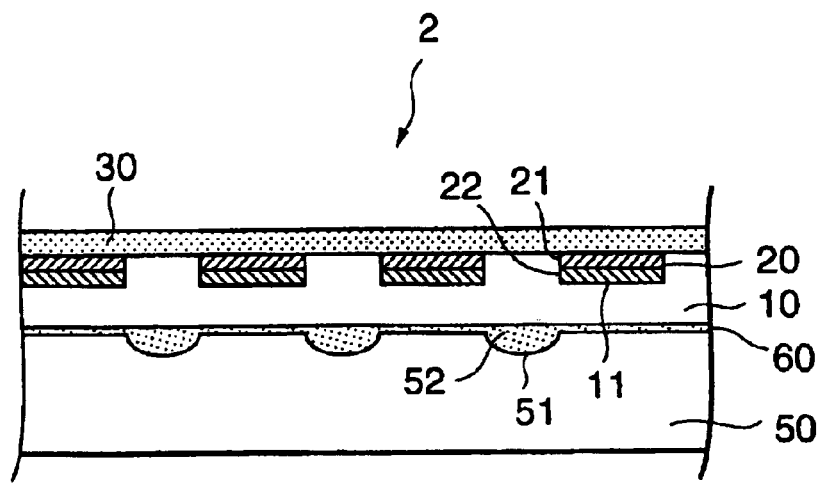
FIG. 2 is a sectional view of an opposite substrate with a microlens substrate according to an embodiment of the present invention.
Figure 3:
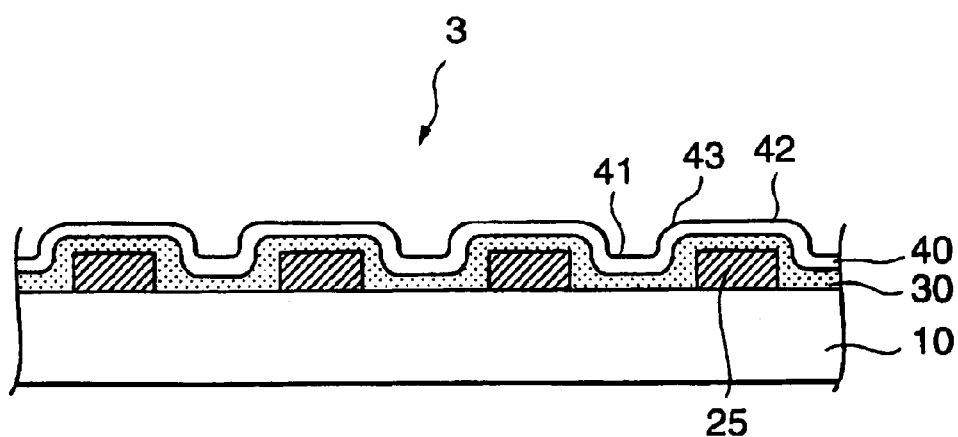
FIG. 3 is a sectional view of a conventional opposite substrate.

FIG. 1A is an exemplary sectional view of an opposite substrate according to an embodiment of the present invention. FIG. 1B is an exemplary sectional view of an opposite substrate according to a modification of the embodiment of the present invention. FIG. 1C is an exemplary sectional view of an opposite substrate according to another modification of the embodiment of the present invention. FIG. 2 is an exemplary sectional view of an opposite substrate with a microlens substrate according to another embodiment of the present invention. FIGS. 4 to 8 are exemplary sectional views showing fabrication processes of an opposite substrate, according to an embodiment of the present invention.

Through FIGS. 1A to 8, corresponding portions are assigned the same reference numerals.

Referring to FIG. 1A, the embodiment of the present invention will be described hereinbelow.

An opposite substrate 1 according to the embodiment of the present invention comprises a transparent substrate 10 formed thereon with a concave portion 11 having a predetermined depth, a light-shielding film 20 formed in the concave portion 11, and a transparent conductive film 30 formed on the transparent substrate 10 and the light-shielding film 20. In this embodiment, the light-shielding film 20 comprises a low reflection film 21 and a high reflection film 22 in the order named from the side of a driving substrate (not shown).

On the surface of the transparent substrate 10, the concave portion 11 with the predetermined depth and a predetermined pitch is formed in a region where a black matrix is formed. The depth of the concave portion 11 is adjusted depending on a thickness of the light-shielding film 20 formed therein in an embedded fashion. As a result, the surface of the transparent substrate 10 and the surface of the light-shielding film 20 embedded in the concave portion 11 are in the same plane.

Since the surface of the transparent substrate 10 and the surface of the light-shielding film 20 are in the same plane, the transparent conductive film 30 formed thereon is formed as a flat film. Further, when an orientation film is formed on the transparent conductive film 30, the orientation film also becomes a flat film.

As a result, when a rubbing treatment is applied to the flat orientation film, the nonuniformity of the rubbing treatment as generated in the prior art is not generated, so that the unevenness of the liquid crystal orientation does not occur in the liquid crystal display panel.

Now, a fabrication method of the opposite substrate 1 will be described as an example with reference to FIGS. 4 to 8.

Figure 4:
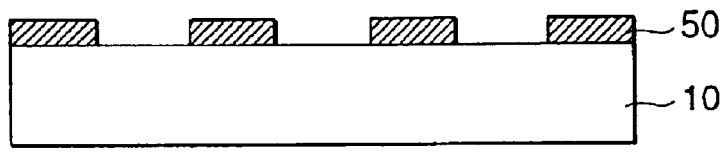
FIG. 4 is a sectional view showing a fabrication process of an opposite substrate, according to an embodiment of the present invention.

As shown in FIG. 4, a mask pattern material 50 is formed on a transparent substrate 10 at regions corresponding to openings of a black matrix.

It is sufficient that a material of the transparent substrate 10 is transparent in a visible light wavelength region. Thus, for example, glass is preferably used. Preferably, soda-lime glass, borosilicate glass, low-alkali glass, no-alkali glass containing no alkali components, crystallized glass, quartz glass, or the like is used.

There is no particular limitation to the mask pattern material 50 as long as it is resistant to an etching material for etching the transparent substrate 10. For example, photosensitive resin (resist) or metal (chrome, chrome alloy) can be used as the mask pattern material 50.

Figure 5:
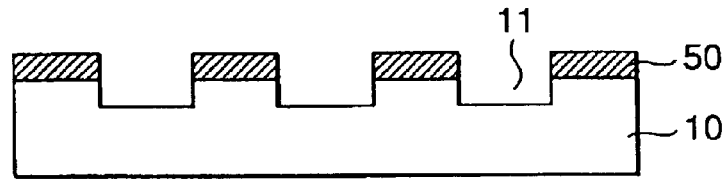
FIG. 5 is a sectional view showing a fabrication process of the opposite substrate, according to the embodiment of the present invention.

Then, as shown in FIG. 5, the surface of the transparent substrate 10 is etched to form a concave portion 11 having a predetermined depth.

Etching may be either wet etching or dry etching. For example, in case of the transparent substrate 10 being made of glass, wet etching may be carried out using hydrofluoric acid or a mixed solution of hydrofluoric acid and potassium fluoride, and dry etching may be carried out using $CF_4+O_2$ mixture gas.

The depth of the concave portion 11 is properly adjusted depending on a thickness of the light-shielding film 20 having a desired optical characteristic (optical density, reflectance, etc.).

For example, when the light-shielding film 20 is made of a material containing Cr, the depth of the concave portion 11 is set to 0.08 $\mu$m or greater, and preferably, 0.08 to 0.2 $\mu$m taking the productivity into consideration. On the other hand, when the light-shielding film 20 is made of a material containing Al, the depth of the concave portion 11 is set to 0.04 $\mu$m or greater, and preferably, 0.04 to 0.1 $\mu$m taking the productivity into consideration. Further, as described later, when the light-shielding film 20 comprises two layers, i.e. the high reflection film 21 (material containing Al) and the low reflection film 22 (material containing Cr), the depth of the concave portion 11 is set to 0.08 $\mu$m or greater, and preferably, 0.08 to 0.2 $\mu$m taking the productivity into consideration.

Figure 6:
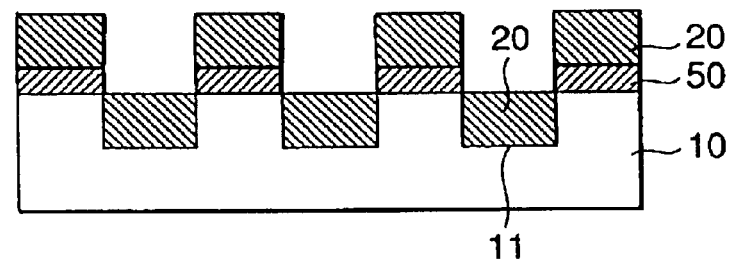
FIG. 6 is a sectional view showing a fabrication process of the opposite substrate, according to the embodiment of the present invention.

Then, as shown in FIG. 6, a light-shielding film 20 is formed on the transparent substrate 10.

As materials of the light-shielding film 20, there are a low reflection material such as a material containing Cr or the like, and a high reflection material such as a material containing Al or the like.

In case the low reflection material is used, there is an effect that, when intense light enters the liquid crystal display panel, stray light generated in the cells is absorbed so that a malfunction of TFTs on the driving substrate, which would be otherwise caused by the stray light, can be prevented.

In case the high reflection material is used, there is an effect that, when intense light enters the liquid crystal display panel, the light hitting the light-shielding film is efficiently reflected so that the increase in temperature of the liquid crystal display panel can be suppressed.

Accordingly, by forming the low reflection film 21 on the side closer to the driving substrate, and the high reflection film 22 on the light-incident side, the light hitting the light-shielding film is efficiently reflected, while the generated stray light is absorbed, so that a malfunction of the liquid crystal display panel can be effectively suppressed.

There is also no particular limitation about a forming method for the light-shielding film 20. Those methods, such as a sputtering method, a vacuum deposition method, a CVD method and an application method, may be used.

In the process shown in FIG. 6, the light-shielding film 20 is formed in the concave portion 11 and on the mask pattern material 50.

By adopting this process, the pattern accuracy of a black matrix is determined by the etching accuracy of the concave portion 11 formed on the transparent substrate 10, and not by the etching accuracy of the light-shielding film.

As compared with the light-shielding film 20, the transparent substrate 10 is far higher in uniformity and has a higher density, so that highly accurate etching is made possible. As a result, the pattern accuracy of the light-shielding film 20 is enhanced as compared with the prior art.

In addition, in the prior art, when forming the light-shielding film using two or more kinds of different materials, there has been the problem that steps are generated at an interface between the respective materials due to a difference in etching characteristic between the respective materials. On the other hand, by adopting this process, etching of the interface between the respective materials is not required any more so that such a problem can be overcome.

As a result, the black matrix with very high dimensional accuracy can be formed.

Figure 7:
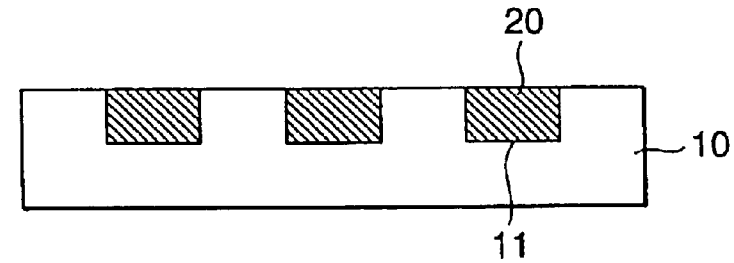
FIG. 7 is a sectional view showing a fabrication process of the opposite substrate, according to the embodiment of the present invention.

Next, as shown in FIG. 7, the mask pattern material 50 and the light-shielding film 20 formed thereon are removed to flatten the surface of the transparent substrate 10.

As a material for removing the mask pattern material 50, such a material is desirable that can remove the mask pattern material 50, but does not corrode the transparent substrate 10 or the light-shielding film 20 formed in the concave portions 11.

On the other hand, if it is difficult to form the light-shielding film 20 having a thickness that coincides with the depth of the concave portion 11, it is desirable that the light-shielding film 20 is formed with a thickness greater than the depth of the concave portion 11, then after removing the mask pattern material 50, the surface of the transparent substrate 10 is polished, thereby to form the surface of the transparent substrate 10 and the surface of the light-shielding film 20 into the same plane. Alternatively, the light-shielding film 20 may be formed with a thickness smaller than the depth of the concave portion 11. At any rate, if the thickness of the light-shielding film 20 is slightly greater or smaller than the depth of the concave portion 11 and if a difference therebetween is small enough to ignore an influence to a later-described rubbing process, the polishing process may be omitted.

Figure 8:
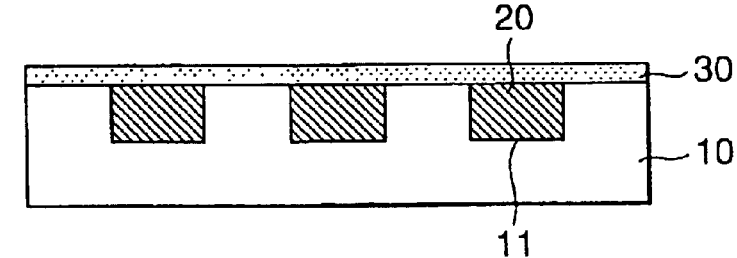
FIG. 8 is a sectional view showing a fabrication process of the opposite substrate, according to the embodiment of the present invention.

Next, as shown in FIG. 8, a transparent conductive film 30 is formed on the surface of the transparent substrate 10 and the surface of the light-shielding film 20 that form the same plane.

Since the surface of the transparent substrate 10 and the surface of the light-shielding film 20 are in the same plane, the transparent conductive film 30 formed thereon is formed into a flat film having no steps, thereby to obtain an opposite substrate having such a flat transparent conductive film 30.

Then, an orientation film is formed on the transparent conductive film 30, and a rubbing treatment is applied to this flat orientation film, then the thus obtained opposite substrate and the driving substrate are adhered to each other, and liquid crystals are poured in between the opposite substrate and the driving substrate that are then sealed, thereby to fabricate a liquid crystal display panel. According to an experiment, it was confirmed that unevenness of liquid crystal molecule orientation did not occur, and unevenness on the liquid crystal display panel did not occur, either.

As a result, the liquid crystal display panel having high image quality can be fabricated.

In the foregoing embodiment, it may also be arranged that a transparent film is formed on the surface of the transparent substrate 10, then a concave portion is formed on the transparent film by etching the transparent film into a predetermined depth, or by etching the transparent film to remove a portion corresponding to a thickness of the transparent film. FIG. 1B shows an opposite substrate wherein a concave portion is formed by removing a portion of a transparent film corresponding to a thickness thereof, and a light-shielding film is formed in the concave portion, and further, a transparent conductive film is formed so as to cover the whole surface. FIG. 1C shows an opposite substrate wherein a concave portion is formed by removing a portion of a transparent film corresponding to a predetermined depth, and a light-shielding film is formed in the concave portion, and further, a transparent conductive film is formed so as to cover the whole surface. In either of FIG. 1B and FIG. 1C, since the transparent conductive film is formed as a flat film, when a liquid crystal display panel is fabricated using such an opposite substrate, unevenness of liquid crystal molecule orientation or display unevenness does not occur.

Now, referring to FIG. 2, an opposite substrate with a microlens substrate according to a different embodiment of the present invention will be described.

The opposite substrate 2 with the microlens substrate shown in FIG. 2 comprises, like the foregoing opposite substrate 1, a transparent substrate 10 formed thereon with a concave portion 11 having a predetermined depth, a light-shielding film 20 formed in the concave portion 11 and comprising a low reflection film 21 and a high reflection film 22, and a transparent conductive film 30 formed on the transparent substrate 10 and the light-shielding film 20. The opposite substrate 2 further comprises a transparent substrate 50 formed thereon with concave portions 51 whose bottom walls form curved surfaces, respectively, high refraction resin 60, and microlenses 52 formed by the concave portions 51 and the high refraction resin 60.

The opposite substrate 2 has a structure wherein the transparent substrate 50 is joined to the foregoing opposite substrate 1 at the light-incident side thereof, and further, the high refraction resin is interposed between the opposite substrate 1 and the transparent substrate 50.

The transparent substrate 50 is provided with many concave portions 51 whose bottom walls form curved surfaces, respectively, wherein the microlenses 52 each having a function of a convex lens are formed to constitute a microlens array.

It is so arranged that the apex of the curved surface of each microlens 52 and the center of a corresponding opening of the light-shielding film 20 coincide with each other.

By providing the microlens substrate as described above, beam of the incident light entering the opposite substrate for the liquid crystal display panel is, after having passed through the transparent substrate 50, narrowed upon passing through the microlenses 52. As a result, most of the incident light passes through the openings of the light-shielding film (black matrix) 20 formed in the concave portion 11 and further passes through the driving substrate without entering TFTs formed on the driving substrate.

Therefore, the optical load and the thermal load applied to the light-shielding film 20 and the TFTs formed on the driving substrate, due to the incident light and the stray light is reduced. Accordingly, there can be obtained the reliable opposite substrate for the liquid crystal display panel that is free of occurrence of malfunction, and further, since the utilization efficiency of the light can be enhanced, a bright and excellent image can be obtained.

Now, a method of fabricating the opposite substrate 2 with the microlens substrate will be described as an example.

At least on one side of the transparent substrate 50 such as a quartz glass substrate, the concave portions 51 whose bottom walls form curved surfaces, respectively, are formed by etching. In this event, using an alignment mark or the like as a reference, it is arranged in advance that the center of each concave portion 51 is located at the center of a corresponding opening of the light-shielding film 20.

Then, the transparent resin 60 having a high refraction greater than a refraction of the transparent substrate 50 is filled in the concave portions 51, then the transparent substrate 10 such as a quartz glass substrate is adhered to the transparent substrate 50 on the side where the concave portions 51 are formed, thereby to obtain a transparent substrate with microlenses (microlens array).

Then, the same processes as applied to the opposite substrate 1 are applied to the transparent substrate 10 forming the transparent substrate with the microlenses, thereby to fabricate the opposite substrate 2 with the microlens substrate.

Then the thus fabricated opposite substrate 2 with the microlens substrate and the driving substrate are adhered to each other, and liquid crystals are poured in between the opposite substrate and the driving substrate that are then sealed, thereby to fabricate a liquid crystal display panel. According to an experiment, it was confirmed that unevenness of liquid crystal molecule orientation did not occur, and unevenness on the liquid crystal display panel did not occur, either.

As a result, the liquid crystal display panel having high image quality can be fabricated.

Any of the substrates in the following stages are shipped as the opposite substrates, i.e. the substrate in the state wherein the light-shielding film 20 is embedded in the concave portion 11 formed on the surface of the transparent substrate 10, the substrate in the state wherein the transparent conductive film 30 (e.g. ITO film) is formed on the substrate in the state where the light-shielding film 20 is embedded, and the substrate in the state wherein the orientation film (e.g. polyimide film) for controlling orientation of liquid crystal molecules is formed on the substrate in the state where the transparent conductive film 30 is formed. Further, the substrate in the state wherein the microlenses are attached to the substrate in each of the foregoing states is also shipped as the opposite substrate.

Now, using examples, the present invention will be described in further detail.

EXAMPLE 1

On a quartz glass substrate having a thickness of 1.1 mm, photosensitive resin having a thickness of 5000 Å was formed by the spin-coating method, then exposure and developing treatments were performed using a photomask to form a photosensitive resin pattern with a width of 4 µm and a pitch of 14 µm on the quartz glass substrate.

Then, using the photosensitive resin pattern as a mask, the quartz glass substrate was etched into a depth of 0.1 µm by an aqueous solution containing hydrofluoric acid (concentration: 10 wt %), thereby to form a matrix-shaped concave portion. Upon observing a section of the formed concave portion using an SEM (Scanning Electron Microscope), it was confirmed that the section of the concave portion was a perpendicular and smooth surface.

Then, a light-shielding film in the form of a Cr thin film having a thickness of 1000 Å was formed by sputtering on the quartz glass substrate on the side where the concave portion was formed.

Then, the photosensitive resin pattern and the Cr thin film on the photosensitive resin pattern were removed by sulfuric acid, thereby to obtain an opposite substrate for a liquid crystal display panel wherein the Cr light-shielding film was embedded in the concave portion formed on the surface of the quartz glass substrate.

The obtained opposite substrate for the liquid crystal display panel exhibited a reflectance of 45% from the side where the Cr thin film was not formed, i.e. the surface of the opposite substrate at the light-incident side (reflectance of the glass substrate surface at the light-incident side+ reflectance of the Cr thin film surface at the light-incident side), and a reflectance of 50% from the side where the Cr thin film was formed, i.e. the Cr thin film surface. Upon observing a pattern of the light-shielding film from the substrate surface, a step called roughness was not generated and a smooth line was exhibited.

Then, a transparent conductive film (ITO film) for a transparent electrode was formed on the substrate on the side where the light-shielding film was formed, thereby to fabricate an opposite substrate for the liquid crystal display panel. It was confirmed that the surface of the transparent conductive film included no step caused by the pattern of the light-shielding film and was flat.

Then, an orientation film (polyimide film) was formed on the transparent conductive film and subjected to a rubbing treatment, then the obtained opposite substrate and a driving substrate were adhered to each other and subjected to pouring of liquid crystals and sealing, thereby to fabricate a liquid crystal display panel. It was confirmed that unevenness on the liquid crystal display panel due to unevenness of liquid crystal molecule orientation was not generated.

EXAMPLE 2

On a quartz glass substrate having a thickness of 1.1 mm, photosensitive resin having a thickness of 5000 Å was formed by the spin-coating method, then exposure and developing treatments were performed using a photomask to form a photosensitive resin pattern with a width of 4 µm and a pitch of 14 µm on the quartz glass substrate.

Then, using the photosensitive resin pattern as a mask, the quartz glass substrate was etched into a depth of 0.08 µm by an aqueous solution containing hydrofluoric acid (concentration: 10 wt %), thereby to form a matrix-shaped concave portion. Upon observing a section of the formed concave portion using an SEM (Scanning Electron Microscope), it was confirmed that the section of the concave portion was a perpendicular and smooth surface.

Then, an Al thin film having a thickness of 200 Å was formed by sputtering on the quartz glass substrate on the side where the concave portion was formed, then a Cr oxide thin film having a thickness of 600 Å was formed in the same manner.

Then, the photosensitive resin pattern, and the Al thin film and the Cr oxide thin film on the photosensitive resin pattern were removed by sulfuric acid, thereby to obtain an opposite substrate for a liquid crystal display panel wherein a light-shielding film having the Al thin film being a high reflection film and the Cr oxide thin film being a low reflection film was embedded in the concave portion formed on the surface of the quartz glass substrate.

The obtained opposite substrate for the liquid crystal display panel exhibited a reflectance of 85% from the side where the Al thin film and the Cr oxide thin film were not formed, i.e. the surface of the opposite substrate at the light-incident side (reflectance of the glass substrate surface at the light-incident side+reflectance of the Al thin film surface at the light-incident side), and a reflectance of 15% from the side where the Al thin film and the Cr oxide thin film were formed, i.e. the Cr oxide thin film surface. Upon observing a pattern of the light-shielding film from the substrate surface, a step called roughness was not generated and a smooth line was exhibited.

Then, a transparent conductive film (ITO film) for a transparent electrode was formed on the substrate on the side where the light-shielding film was formed, thereby to fabricate an opposite substrate for the liquid crystal display panel. It was confirmed that the surface of the transparent conductive film included no step caused by the pattern of the light-shielding film and was flat.

Then, an orientation film (polyimide film) was formed on the transparent conductive film and subjected to a rubbing treatment, then the obtained opposite substrate and a driving substrate were adhered to each other and subjected to pouring of liquid crystals and sealing, thereby to fabricate a liquid crystal display panel. It was confirmed that unevenness on the liquid crystal display panel due to unevenness of liquid crystal molecule orientation was not generated.

Further, since the obtained opposite substrate for the liquid crystal display panel efficiently reflects incident light hitting the light-shielding film, the highly excellent liquid crystal display panel was obtained wherein the increase in temperature of the liquid crystal display panel was small and lowering of the contrast due to a malfunction of the liquid crystal display panel was also small.

EXAMPLE 3

On a quartz glass substrate having a thickness of 1.1 mm, photosensitive resin having a thickness of 5000 Å was formed by the spin-coating method, then exposure and developing treatments were performed using a photomask to form a photosensitive resin pattern with a width of 4 µm and a pitch of 14 µm on the quartz glass substrate.

Then, using the photosensitive resin pattern as a mask, the quartz glass substrate was etched into a depth of 0.1 µm by an aqueous solution containing hydrofluoric acid (concentration: 10 wt %), thereby to form a matrix-shaped concave portion. Upon observing a section of the formed concave portion using an SEM (Scanning Electron Microscope), it was confirmed that the section of the concave portion was a perpendicular and smooth surface.

Then, a light-shielding film in the form of a thin film whose composition changes continuously from Cr to Cr oxide and having a thickness of 1200 Å was formed by in-line sputtering on the quartz glass substrate on the side where the concave portion was formed.

Then, the photosensitive resin pattern and the Cr—Cr oxide thin film on the photosensitive resin pattern were removed by sulfuric acid.

Then, one-side precision polishing was applied to the surface of the quartz glass substrate on the side where the light-shielding film was formed, using a polishing apparatus while slurry of Ce oxide was supplied to the glass surface, then acid cleaning was carried out, thereby to obtain an opposite substrate for a liquid crystal display panel wherein the Cr—Cr oxide light-shielding film was embedded in the concave portion formed on the surface of the quartz glass substrate.

The obtained opposite substrate for the liquid crystal display panel exhibited a reflectance of 45% from the side where the Cr—Cr oxide thin film was not formed, i.e. the surface of the opposite substrate at the light-incident side (reflectance of the glass substrate surface at the light-incident side+reflectance of the Cr thin film surface at the light-incident side), and a reflectance of 15% from the side where the Cr—Cr oxide thin film was formed, i.e. the Cr oxide thin film surface. Upon observing a pattern of the light-shielding film from the substrate surface, a step called roughness was not generated and a smooth line was exhibited.

Then, a transparent conductive film (ITO film) for a transparent electrode was formed on the substrate on the side where the light-shielding film was formed, thereby to fabricate an opposite substrate for the liquid crystal display panel. It was confirmed that the surface of the transparent conductive film included no step caused by the pattern of the light-shielding film and was flat.

Then, an orientation film (polyimide film) was formed on the transparent conductive film and subjected to a rubbing treatment, then the obtained opposite substrate and a driving substrate were adhered to each other and subjected to pouring of liquid crystals and sealing, thereby to fabricate a liquid crystal display panel. It was confirmed that unevenness on the liquid crystal display panel due to unevenness of liquid crystal molecule orientation was not generated.

Further, since the obtained opposite substrate for the liquid crystal display panel reflects incident light hitting the light-shielding film, the highly excellent liquid crystal display panel was obtained wherein the increase in temperature of the liquid crystal display panel was small and lowering of the contrast due to a malfunction of the liquid crystal display panel was also small.

COMPARATIVE EXAMPLE 1

On a quartz glass substrate having a thickness of 1.1 mm, an Al thin film having a thickness of 300 Å was formed by sputtering, and further, a Cr oxide thin film having a thickness of 800 Å was formed by sputtering, thereby to obtain a light-shielding film.

Then, photosensitive resin having a thickness of 5000 Å was formed on the light-shielding film by the spin-coating method, then using a photomask, a photosensitive resin pattern for forming a matrix-shaped light-shielding film with a width of 4 μm and a pitch of 14 μm was formed.

Then, using the photosensitive resin pattern as a mask, the quartz glass substrate was immersed in a ferric chloride solution to etch the Cr oxide thin film, then in a mixed solution of phosphoric acid and nitric acid to etch the Al thin film, and further immersed in an alkaline aqueous solution to dissolve and remove the photosensitive resin pattern, thereby to obtain an opposite substrate for a liquid crystal display panel.

The obtained opposite substrate for the liquid crystal display panel exhibited a reflectance of 82% from the side where the Al thin film and the Cr oxide thin film were not formed, i.e. the surface of the opposite substrate at the light-incident side (reflectance of the glass substrate surface at the light-incident side+reflectance of the Al thin film surface at the light-incident side), and a reflectance of 12% from the side where the Al thin film and the Cr oxide thin film were formed, i.e. the Cr oxide thin film surface.

Upon observing a pattern section of the light-shielding film using an SEM, a step was generated at an interface between the Al thin film and the Cr oxide thin film, and upon observing the pattern from the substrate surface, a step called roughness was generated.

Then, a transparent conductive film (ITO film) for a transparent electrode was formed on the substrate on the side where the light-shielding film was formed, thereby to fabricate an opposite substrate for the liquid crystal display panel. However, a step approximately corresponding to a thickness of the light-shielding film pattern was confirmed on the surface of the transparent conductive film.

Then, an orientation film (polyimide film) was formed on the transparent conductive film and subjected to a rubbing treatment, then the obtained opposite substrate and a driving substrate were adhered to each other and subjected to pouring of liquid crystals and sealing, thereby to fabricate a liquid crystal display panel. However, the rubbing treatment was not performed uniformly at the step of the light-shielding film pattern, thereby to cause unevenness of liquid crystal molecule orientation, so that unevenness on the liquid crystal display panel occurred.

EXAMPLE 4

On a quartz glass substrate having a thickness of 1.1 mm, a metal film (Cr thin film) having a thickness of 500 Å was formed by sputtering, then exposure and developing treatments were performed using a photomask to form a Cr pattern with a width of 4 μm and a pitch of 14 μm on the quartz glass substrate.

Then, using the Cr pattern as a mask, the quartz glass substrate was etched into a depth of 0.085 μm using a reactive ion etching apparatus and using $CF_4+O_2$ mixture gas as etching gas, thereby to form a matrix-shaped concave portion. Upon observing a section of the formed concave portion using an SEM, because the mask pattern was the metal film, and further, etching was dry etching, it was confirmed that, as compared with dry etching of the foregoing examples 1 to 3, the section of the concave portion was a perpendicular and smooth surface that was further excellent in section characteristic.

Then, a light-shielding film in the form of an Al thin film having a thickness of 250 Å was formed by sputtering on the quartz glass substrate on the side where the concave portion was formed, then a light-shielding film made of MoSi (molybdenum silicide) oxide and having a thickness of 600 Å was formed.

Then, the Cr pattern, and the Al thin film and the MoSi oxide thin film on the Cr pattern were removed by an aqueous solution of ceric nitrate ammonium and perchloric acid, thereby to obtain an opposite substrate for a liquid crystal display panel wherein a light-shielding film having, in a stacked fashion, the Al thin film being a high reflection film and the MoSi oxide thin film being a low reflection film was embedded in the concave portion formed on the surface of the quartz glass substrate.

The obtained opposite substrate for the liquid crystal display panel exhibited a reflectance of 85% from the side where the Al thin film and the MoSi oxide thin film were not formed, i.e. the surface of the opposite substrate at the light-incident side (reflectance of the glass substrate surface at the light-incident side+reflectance of the Al thin film surface at the light-incident side), and a reflectance of 17% from the side where the Al thin film and the MoSi oxide thin film were formed, i.e. the MoSi oxide thin film surface.

Upon observing a pattern of the light-shielding film from the substrate surface, a step called roughness was not generated and a smooth line was exhibited.

Then, a transparent conductive film (ITO film) for a transparent electrode was formed on the substrate on the side where the light-shielding film was formed, thereby to fabricate an opposite substrate for the liquid crystal display panel. It was confirmed that the surface of the transparent conductive film included no step caused by the pattern of the light-shielding film and was flat.

Then, an orientation film (polyimide film) was formed on the transparent conductive film and subjected to a rubbing treatment, then the obtained opposite substrate and a driving substrate were adhered to each other and subjected to pouring of liquid crystals and sealing, thereby to fabricate a liquid crystal display panel. It was confirmed that unevenness on the liquid crystal display panel due to unevenness of liquid crystal molecule orientation was not generated.

Further, since the obtained opposite substrate for the liquid crystal display panel efficiently reflects incident light hitting the light-shielding film, the highly excellent liquid crystal display panel was obtained wherein the increase in temperature of the liquid crystal display panel was small and lowering of the contrast due to a malfunction of the liquid crystal display panel was also small.

EXAMPLE 5

An $SiO_2$ coat forming liquid was applied to a quartz glass substrate having a thickness of 1.1 mm by the spin-coating method, then subjected to a baking treatment at 250° C. for 30 minutes, thereby to form an SOG (Spin On Glass) film having an $SiO_2$ thickness of 850 Å. On this SOG film, photosensitive resin having a thickness of 5000 Å was formed by the spin-coating method, then exposure and developing treatments were performed using a photomask to form a photosensitive resin pattern with a width of 4 $\mu$m and a pitch of 14 $\mu$m on the quartz glass substrate.

Then, using the photosensitive resin pattern as a mask, the quartz glass substrate was etched into a depth of 0.085 $\mu$m using a reactive ion etching apparatus and using $CF_4+O_2$ mixture gas as etching gas, thereby to form a matrix-shaped concave portion of SOG on the quartz glass substrate. Upon observing a section of the formed concave portion using an SEM, it was confirmed that the section of the concave portion was a perpendicular and smooth surface.

Then, an Al thin film having a thickness of 250 Å was formed by sputtering on the quartz glass substrate on the side where the concave portion was formed, then a Cr oxide thin film having a thickness of 600 Å was formed in the same manner.

Then, the photosensitive resin pattern, and the Al thin film and the Cr oxide thin film on the photosensitive resin pattern were removed by sulfuric aid, thereby to obtain an opposite substrate for a liquid crystal display panel wherein the Al thin film being a high reflection film and the Cr oxide thin film being a low reflection film were embedded in the concave portion formed on the surface of the quartz glass substrate.

The obtained opposite substrate for the liquid crystal display panel exhibited a reflectance of 85% from the side where the Al thin film and the Cr oxide thin film were not formed, i.e. the surface of the opposite substrate at the light-incident side (reflectance of the glass substrate surface at the light-incident side+reflectance of the Al thin film surface at the light-incident side), and a reflectance of 15% from the side where the Al thin film and the Cr oxide thin film were formed, i.e. the Cr oxide thin film surface. Upon observing a pattern of the light-shielding film from the substrate surface, a step called roughness was not generated and a smooth line was exhibited.

Then, a transparent conductive film (ITO film) for a transparent electrode was formed on the substrate on the side where the light-shielding film was formed, thereby to fabricate an opposite substrate for the liquid crystal display panel. It was confirmed that the surface of the transparent conductive film included no step caused by the pattern of the light-shielding film and was flat.

Then, an orientation film (polyimide film) was formed on the transparent conductive film and subjected to a rubbing treatment, then the obtained opposite substrate and a driving substrate were adhered to each other and subjected to pouring of liquid crystals and sealing, thereby to fabricate a liquid crystal display panel. It was confirmed that unevenness on the liquid crystal display panel due to unevenness of liquid crystal molecule orientation was not generated.

Further, since the obtained opposite substrate for the liquid crystal display panel efficiently reflects incident light hitting the light-shielding film, the highly excellent liquid crystal display panel was obtained wherein the increase in temperature of the liquid crystal display panel was small and lowering of the contrast due to a malfunction of the liquid crystal display panel was also small.

EXAMPLE 6

On a quartz glass substrate having a thickness of 1.1 mm, photosensitive resin having a thickness of 5000 Å was formed by the spin-coating method, then exposure and developing treatments were performed using a photomask to form a photosensitive resin pattern with a width of 4 $\mu$m and a pitch of 14 $\mu$m on the quartz glass substrate.

Then, using the photosensitive resin pattern as a mask, the quartz glass substrate was etched into a depth of 2.5 $\mu$m by an aqueous solution containing hydrofluoric acid (concentration: 10 wt %), thereby to form a matrix-shaped concave portion. Upon observing a section of the formed concave portion using an SEM, it was confirmed that the section of the concave portion was a perpendicular and smooth surface.

Then, a high refraction dielectric thin film in the form of a $TiO_2$ (titanium oxide) thin film having a thickness of 540 Å and a low refraction dielectric thin film in the form of an $SiO_2$ (silicon oxide) thin film having a thickness of 850 Å were formed by sputtering, thereby to form reflection increasing films on the quartz glass substrate on the side where the concave portion was formed, then a high reflection thin film in the form of an Al thin film having a thickness of 300 Å and a low reflection thin film in the form of a Cr nitride thin film having a thickness of 810 Å were formed, thereby to form a light-shielding film in the concave portion.

Then, the photosensitive resin pattern, and the $TiO_2$ thin film, the $SiO_2$ thin film, the Al thin film and the Cr nitride thin film on the photosensitive resin pattern were removed by sulfuric acid, thereby to obtain an opposite substrate for a liquid crystal display panel wherein the light-shielding film having, in a stacked fashion, the reflection increasing films in the form of the $TiO_2$ thin film and the $SiO_2$ thin film, the high reflection film in the form of the Al thin film, and the low reflection film in the form of the Cr nitride film were embedded in the concave portion formed on the surface of the quartz glass substrate.

The obtained opposite substrate for the liquid crystal display panel exhibited a reflectance of 92% from the side where the light-shielding film was not formed, i.e. the surface of the opposite substrate at the light-incident side (reflectance of the glass substrate surface at the light-incident side+reflectance of the light-shielding film surface at the light-incident side), and a reflectance of 18% on the Cr nitride thin film surface.

Upon observing a pattern of the light-shielding film from the substrate surface, a step called roughness was not generated and a smooth line was exhibited.

Then, a transparent conductive film (ITO film) for a transparent electrode was formed on the substrate on the side where the light-shielding film was formed, thereby to fabricate an opposite substrate for the liquid crystal display panel. It was confirmed that the surface of the transparent conductive film included no step caused by the pattern of the light-shielding film and was flat.

Then, an orientation film (polyimide film) was formed on the transparent conductive film and subjected to a rubbing treatment, then the obtained opposite substrate and a driving substrate were adhered to each other and subjected to pouring of liquid crystals and sealing, thereby to fabricate a liquid crystal display panel. It was confirmed that unevenness on the liquid crystal display panel due to unevenness of liquid crystal molecule orientation was not generated.

Further, since the obtained opposite substrate for the liquid crystal display panel reflects incident light hitting the light-shielding film more efficiently, i.e. 90% or more, the highly excellent liquid crystal display panel was obtained wherein the increase in temperature of the liquid crystal display panel was small and lowering of the contrast due to a malfunction of the liquid crystal display panel was also small.

EXAMPLE 7

At least on one side of a quartz glass substrate, concave portions whose bottom walls form curved surfaces, respectively, were formed by isotropic etching. In this case, using an alignment mark or the like as a reference, it is arranged in advance that the center of each concave portion is located at the center of a corresponding opening of a light-shielding film (black matrix) formed in a later-described concave portion.

Transparent resin having a high refraction greater than a refraction of the quartz glass substrate was filled into the concave portions. Then, another quartz glass substrate was adhered to a surface of the quartz glass substrate where the concave portions are opened, thereby to fabricate a quartz glass substrate with microlenses (microlens array).

Then, on the surface of the another quartz glass substrate on the side where the microlenses were not formed, the light-shielding film (black matrix) was formed in the concave portion in the same manner as in Example 1, thereby to fabricate an opposite substrate with a microlens array for a liquid crystal display panel. In this event, the focus of each microlens and the center of a corresponding opening of the light-shielding film were made to coincide with each.

Upon observing a pattern of the light-shielding film from the substrate surface, a step called roughness was not generated and a smooth line was exhibited.

Then, a transparent conductive film (ITO film) for a transparent electrode was formed on the opposite substrate on the side where the light-shielding film was formed, thereby to fabricate an opposite substrate with the microlenses for the liquid crystal display panel. It was confirmed that the surface of the transparent conductive film included no step caused by the pattern of the light-shielding film and was flat.

Then, an orientation film (polyimide film) was formed on the transparent conductive film and subjected to a rubbing treatment, then the obtained opposite substrate and a driving substrate were adhered to each other and subjected to pouring of liquid crystals and sealing, thereby to fabricate a liquid crystal display panel. It was confirmed that unevenness on the liquid crystal display panel due to unevenness of liquid crystal molecule orientation was not generated.

In this example, by providing the microlens substrate to the liquid crystal display panel, beam of incident light entering the opposite substrate for the liquid crystal display panel is, after having passed through the glass substrate, narrowed upon passing through the microlenses.

As a result, most of the incident light passes through gap portions of the light-shielding film and further passes through the driving substrate without entering TFTs formed on the driving substrate.

Therefore, the excellent liquid crystal display panel can be obtained that is free of occurrence of malfunction and thus is highly reliable, and that can project a bright and excellent image according to the high utilization efficiency of the light.

In the foregoing example 3, the acid cleaning was carried out after the polishing process. However, other than the acid cleaning, alkali cleaning or cleaning using pure water or detergent may also be used. As acid that may be used in the acid cleaning, hydrofluoric acid, hydrofluosilic acid, sulfuric acid or their composite acid can be cited. For the alkali cleaning, sodium hydroxide or potassium hydroxide can be cited. Preferably, such chemicals are desirable that can effectively remove slurry used in the polishing process, and further, that do not etch the substrate or the light-shielding film. Low-concentration hydrofluoric acid, low-concentration hydrofluosilic acid or their composite acid is suitable. There is no particular limitation about a cleaning method, and dipping type cleaning or scrubbing type cleaning, which has been generally carried out, can be used.

What is claimed is:

1. A method of fabricating an opposite substrate with microlenses for a liquid crystal display panel, said opposite substrate being opposite through a liquid crystal layer to a driving substrate which has a plurality of pixel electrodes and a plurality of switching elements for individually switching said plurality of the pixel electrodes, said opposite substrate being provided with the microlenses formed on a back side of the side opposed to a front side faced to the driving substrate, the method comprising the steps of:

forming a plurality of concave portions at least one surface of a light-transmitting glass substrate, each of said concave portions having a curved surface on a bottom wall thereof;

filling, into said concave portions, a transparent material having a refraction index greater than that of said light-transmitting glass substrate to form microlenses;

bonding an additional light-transmitting glass substrate onto the surface of the light-transmitting glass substrate which has the microlenses and to thereby obtain a substrate with microlenses, said concave portions being opened towards the additional light-transmitting glass substrate in the substrate with the microlenses;

forming a mask pattern either on the other surface of the additional light-transmitting glass substrate without any microlenses or on a transparent film formed on the other surface of the additional light-transmitting glass substrate, the mask pattern being arranged at least on regions opposite to the switching elements and withstanding etching of the light-transmitting substrate or the transparent film;

etching the additional light-transmitting glass substrate or the transparent film by using the mask pattern as a mask to form concave portions having a predetermined depth;

forming a light shielding film on the additional light-transmitting glass substrate on which the concave portions are formed, by successively stacking a high reflection thin film of a high reflection material and a low reflection thin film of a low reflection material to form a stacked light shielding film; and removing the mask pattern and the light-shielding film formed on the mask pattern to embed the stacked light-shielding film in the concave portions.

2. A method as claimed in claim 1, further comprising the step of:

aligning the additional light-transmitting glass substrate with the light-transmitting glass substrate by using an alignment mark formed on the light-transmitting glass substrate with microlenses, so that centers of openings left between the stacked light-shielding film left on the concave portions are located at apexes of the curved surfaces of the concave portions in the light-transmitting substrate.

3. A method as claimed in claim 1, wherein the high reflection material is formed by a material selected from a group consisting of metals of Ni, Ag, Pt, Al and Al alloy while the low reflection material is formed by a material selected from a group consisting of Cr, Ni, and their oxides, nitrides, oxide-nitrides.

4. A method claimed in claim 1, further comprising the step of:

forming a reflection augmenting film between the additional light-transmitting glass substrate or the transparent film and the high reflection film, said reflection augmenting film comprising a high reflection dielectric film with a relatively high reflection index and a low reflection dielectric film with a relatively low reflection index, both of which are alternately stacked.

* * * * *